United States Patent
Joseph et al.

(10) Patent No.: US 8,566,170 B1
(45) Date of Patent: *Oct. 22, 2013

(54) REDUCING PURCHASE HESITANCE

(75) Inventors: B. Anthony Joseph, Bellevue, WA (US); Matthew K. Green, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1588 days.

This patent is subject to a terminal disclaimer.

(21) Appl. No.: 12/039,794

(22) Filed: Feb. 29, 2008

(51) Int. Cl.
   *G06Q 30/00* (2012.01)
(52) U.S. Cl.
   USPC ............ 705/26.1; 705/27.1; 705/14.1
(58) Field of Classification Search
   USPC ................................. 705/26, 27, 14
   See application file for complete search history.

(56) References Cited

U.S. PATENT DOCUMENTS

| | | | |
|---|---|---|---|
| 6,058,379 A | | 5/2000 | Odom et al. |
| 7,062,460 B1 | | 6/2006 | Growney et al. |
| 7,296,001 B1 | * | 11/2007 | Ephrati et al. ............ 705/37 |
| 7,912,755 B2 | * | 3/2011 | Perry et al. ............. 705/26.8 |
| 7,933,818 B1 | * | 4/2011 | Kumar et al. ............ 705/35 |
| 2008/0133349 A1 | * | 6/2008 | Nazer et al. ............ 705/14 |
| 2008/0195476 A1 | * | 8/2008 | Marchese et al. ......... 705/14 |

OTHER PUBLICATIONS

Second Bite: Internet Archive Wayback Machine, www.archive.org; www.secondbite.com; Feb. 2007; 4pgs.*

* cited by examiner

*Primary Examiner* — Rob Pond
(74) *Attorney, Agent, or Firm* — Thomas | Horstemeyer, LLP

(57) ABSTRACT

Disclosed are various embodiments of systems, methods, and computer programs that facilitate reducing purchase hesitance. At least one product offered by a seller at an initial price is displayed to a buyer. Activity of the buyer throughout an electronic commerce system is tracked. Purchase hesitance in the activity is identified. A concession is offered to the buyer by the seller to provide incentive to the buyer to purchase the product within the electronic commerce system.

42 Claims, 8 Drawing Sheets

REDUCING PURCHASE HESITANCE

BACKGROUND

In an electronic retail setting, buyers may be hesitant to purchase an item in an electronic commerce system. Consequently, sales may be lost due to the hesitancy of buyers and an inability of sellers to address such hesitancy.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
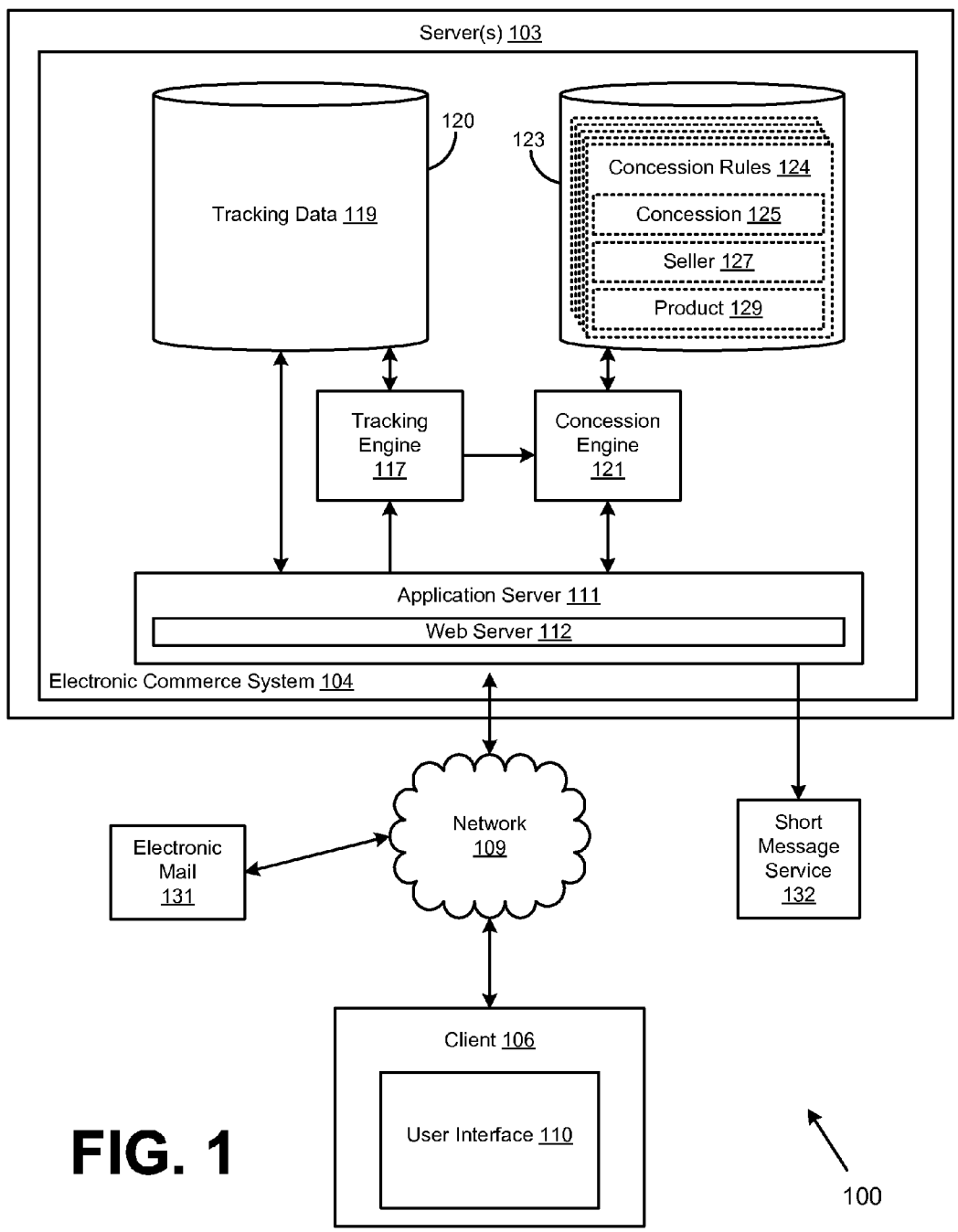
FIG. 1 is a drawing of a network having a plurality of clients and an exemplary server in an electronic commerce system according to an embodiment of the present disclosure.

With reference to FIG. 1, shown is a networked environment 100 for providing for reducing purchase hesitance of a potential buyer that includes, for example, at least one server 103 implementing an electronic commerce system 104 and at least one client 106. The server 103 may represent multiple servers that may be arranged to work in coordination with each other. Alternatively, such servers may be arranged in some other manner, as can be appreciated. The client 106 is representative of multiple clients 106 that are configured to access information on the server 103. Both the server 103 and the client 106 are coupled to a network 109. The network 109 may include, for example, any type of network environment such as the Internet, intranets, local area networks, wide area networks (WANs), wireless networks, cellular networks, phone networks, or other suitable networks as can be appreciated or any combination of two or more such networks.

Various user interfaces 110 are generated on a display device of the client 106 to facilitate interaction with the various systems or components implemented on the server 103 and within an application server 111. The client 106 is configured to interface with the various systems on the server 103 in order to effect the viewing of products, product offers from sellers, and facilitate the purchase of products within the electronic commerce system 104. With respect to the various embodiments, the client 106 interfaces with the application server 111 and its various applications via the web server 112.

According to various embodiments, the server 103 includes various applications that are executed, for example, to effect order fulfillment for a seller in an electronic commerce system 104. To this end, the application server 111 is executed in the server(s) 103, which may in turn execute other systems for interacting with a client 106 via the network 109. Systems running in an application server 111 in an electronic commerce system 104 may include but are not limited to order fulfillment systems, dynamic network or web page servers, inventory systems, or other systems as can be appreciated. However, such systems are not described herein in detail.

The depicted server 103 is configured to track the activity of a potential buyer throughout the electronic commerce system 104. It should be appreciated that a potential buyer, by manipulating a user interface 110 within client 106, may browse, search, view, or purchase products and services or conduct any other activity that should be appreciated in an electronic commerce system. The tracking engine 117 receives data from the application server 111 and/or web server 112 regarding the activity of a potential buyer throughout the system. The tracking engine 117 is configured to identify behavior associated with hesitance to purchase an item that the potential buyer may be viewing, is presently viewing, viewed in the past, or attempted to purchase. The tracking engine 117 is configured to determine whether a potential buyer in the electronic commerce system is on the verge or very near a purchase decision but is exhibiting purchase hesitance and may be enticed or incentivised to purchase a product.

As a user manipulates a user interface 110 in a client 106, the tracking engine 117 may store tracking data 119 within the tracking data store 120 regarding the activity of the potential buyer activity within the electronic commerce system 104. The tracking engine 117 may store such data within the tracking data store 120 to identify activity of a potential buyer associated with a hesitance to purchase a product as such activity may manifest itself over time. Therefore, the tracking engine 117 may store and retrieve tracking data 119 from the tracking data store 120 regarding such activity in order to identify such behavior. For example, a potential buyer may view a product at a particular point in time and subsequently view the same product at a second point in time that is far removed from the first. It is possible that such activity, when viewed together may be identified as purchase hesitance.

The tracking engine 117 may identify various other behaviors associated with a hesitance on the part of a potential buyer of a product within the electronic commerce system. The tracking engine 117 may also identify behavior associated with a hesitance to purchase an item from a particular seller, as multiple sellers may sell the same or similar items within the electronic commerce system 104 in a competitive environment. Therefore, the tracking engine 117 may detect that a potential buyer is exhibiting a hesitance to purchase a product from a first seller, while leaning towards purchasing the same product from a second seller. For example, if the first seller is offering a product at a price that is higher than the price of the second seller, or if the first seller has other deficiencies relative to the second seller, such as a lower rating, less desirable shipping terms, a worse reputation in the marketplace, a lower feedback rating, or other factors that should be appreciated, then the tracking engine 117 can identify a purchase hesitance to purchase the item from the first seller.

As an additional example of identifying purchase hesitance, the tracking engine 117 may identify when a potential buyer adds an item to a shopping cart but then fails to follow through to purchase the item from a particular seller. Alternatively, the tracking engine 117 may identify when the potential buyer adds an item to a shopping cart and then subsequently removes the item from the cart. If a potential buyer exhibits such activity repetitively, the tracking engine 117 may identify such behavior as purchase hesitance. It should be appreciated that repeatedly adding and removing a particular product from a shopping cart can indicate that a potential buyer may be on the verge of making a purchase decision, but is exhibiting purchase hesitance. Similarly, if a potential buyer adds an item to a shopping cart and/or submits purchasing information (e.g. shipping address and credit card information) to the electronic commerce system 104, but subsequently decides to cancel or abandon the purchase, then such behavior can also be identified by the tracking engine 117 as purchase hesitance.

As an additional non-limiting example of identifying purchase hesitance within the electronic commerce system 104, the tracking engine 117 may identify whether a user views a product and then subsequently searches for a substitute product. Alternatively, the tracking engine 117 may identify whether a potential buyer views a product offered by a first seller and then subsequently searches for the same product from an alternate seller or instead, exiting the electronic commerce system altogether.

The tracking engine 117 can also be configured to identify behavior associated with the buyer viewing or expressing an interest in an alternative or substitute product. For example, the tracking engine 117 may identify that a potential buyer is viewing an entry-level product and detect that such activity reflects a hesitance to purchase a premium level product due to the difference in price. As another alternative example, if a potential buyer views a product various attributes of the product including product details and product imagery for an extended period of time without making a purchase decision, the tracking engine 117 may determine that the potential buyer is exhibiting purchase hesitance. It should be appreciated that the above noted examples of detecting purchase hesitance should not be considered to be an exhaustive list, and other behavior associated with purchase hesitance should be appreciated.

The tracking engine 117 may further identify purchase hesitance by examining a shopping cart, "wish list" or other shopping list associated with a potential buyer and identifying whether a particular item has been present but not purchased by the potential buyer for a predetermined of time. Such predetermined period of time can be several days, weeks, or even months, depending on the type, cost, condition, or other attributes of the product and can be indicative of a potential buyer's desire as well as hesitance to purchase the product.

Upon detecting purchase hesitance of a potential buyer within the electronic commerce system, the tracking engine 117 can alert the concession engine 121 that activity of a potential buyer exhibits behavior associated with a hesitance to purchase an item from a particular seller. Accordingly, the concession engine 121 may offer a concession to a potential buyer that is configured to reduce the purchase hesitance of the potential buyer or incentivise the potential buyer to purchase the item. A concession offered by the system to a potential buyer can be an additional complimentary or discounted product, a price reduction, or other form of concession that should be appreciated. A complimentary product can mean an additional product that may be desired by potential buyers for the functioning or enjoyment of the product, such as, for example, a connection cable that may be associated with a computer peripheral in which a potential buyer is interested.

A concession can also include free or reduced price shipping, free or reduced price gift wrapping, a discount for a future purchase, or any other enticement or incentive that may reduce the purchase hesitance of the potential buyer and increase the likelihood of the potential buyer purchasing an item from a seller in the electronic commerce system 104. A concession can also include any type of service upgrade, which can include, but is not limited to: expedited shipping or fulfillment, a more liberal return policy relative to a standard return policy, a complimentary or reduced cost extended warranty, or any other type of service upgrade that should be appreciated. A concession can also include a bulk discount, or a price reduction offered to a potential buyer in exchange for the purchase of a higher quantity of a product. For example, if a potential buyer expresses an interest in purchasing a single quantity of a particular item, a concession can be offered in the form of a lower price per item if the potential buyer purchases more than a single quantity. It should be appreciated that the above concessions are not an exhaustive list and are merely representative examples.

To determine a concession offered by the concession engine 121 to a potential buyer, the engine may communicate with the concession data store 123 to retrieve a concession rule 124. A concession rule 124 in the concession data store 123 defines the concession 125 that can be offered to a potential buyer that is identified by the tracking engine 117 to be exhibiting purchase hesitance. A concession rule 124 can also associate a seller 127 and a product 129 with the rule. The seller 127 and product 129 can correspond to a particular seller or product within the electronic commerce system 104 for which a potential buyer is identified by the tracking engine 117 to be exhibiting purchase hesitance.

A seller in the electronic commerce system 104 may enter or define a concession rule 124 by manipulating a user interface 110 in a client 106. For example, a seller 127 may determine to offer to hesitant buyers an additional complimentary product that is associated with a product 129. Such association can mean an additional product that may be typically desired by potential buyers for the functioning or enjoyment of the product, such as, for example, a connection cable that may be associated with a computer peripheral in which a potential buyer is interested. The associated product can be identified in the concession rule 124 as a concession 125. Accordingly, the seller 127 may manipulate a user interface 110 and cause such a concession rule 124 to be stored within the concession data store 123 for retrieval by the concession engine 121. As noted above, a concession 125 defined by a concession rule 124 can include any incentive or enticement configured to reduce purchase hesitance of a potential buyer.

The concession engine 121, when alerted by the tracking engine 117 that a potential buyer is exhibiting purchase hesitance, may also notify a seller 127 in the electronic commerce system 104 that a potential buyer is presently exhibiting purchase hesitance and allow the seller 127 to determine whether to offer or define a concession 125 at that time. For example, if purchase hesitance is detected and no concession rule is associated with a particular product 129 and seller 127, the concession engine 121 may notify the seller via electronic mail 131, short message service 132 or other messaging approach. The concession engine 121 can present the seller with the identity of a potential buyer, a product 129 that the potential buyer may be interested in, and allow the seller to offer or define a concession that may be presented to a potential buyer to reduce his or her purchase hesitance.

Once a concession 125 is retrieved from the concession data store 123 or received from a seller, the concession engine 121 can present a revised offer to a potential buyer via the client 106. A revised offer can include the product 129 and concession 125. The concession engine 121 may also calculate a value associated with the revised offer for presentation to the potential buyer. For example, the revised offer can include the product 129 in which a potential buyer may be interested and the concession 125 associated with the product 129. The concession 125 could be an additional item, a price reduction, or an alternative concession such as free shipping or free gift-wrapping as mentioned above. The concession engine 121 may notify a potential buyer of a revised offer via electronic mail 131, short message service 132, in a user interface 110 on the client 106 or using another approach as can be appreciated.

The concession engine 121 can also calculate and display a monetary value of the revised offer, which can be configured to further incentivise the potential buyer by informing the potential buyer of an improved value of products and/or services in the revised offer relative to purchasing the product without a concession 125. The concession engine 121 may further incentivise a potential buyer by configuring the revised offer to expire. In this way, an element of pressure can be applied to the potential buyer due to the expiry of the revised offer, which may affect the decision of a potential buyer to make a purchase.

The concession engine 121 may also autonomously identify a concession to offer to a potential buyer exhibiting purchase hesitance without intervention from a seller or the aid of a concession rule 124 from the concession data store 123. For example, the concession engine 121 may identify an additional product in the inventory of a seller and offer the additional to a potential buyer in the form of a revised offer. The concession engine 121 may also autonomously generate an expiration time of the revised offer to add an element pressure to the purchase decision of a potential buyer.

Figure 2:
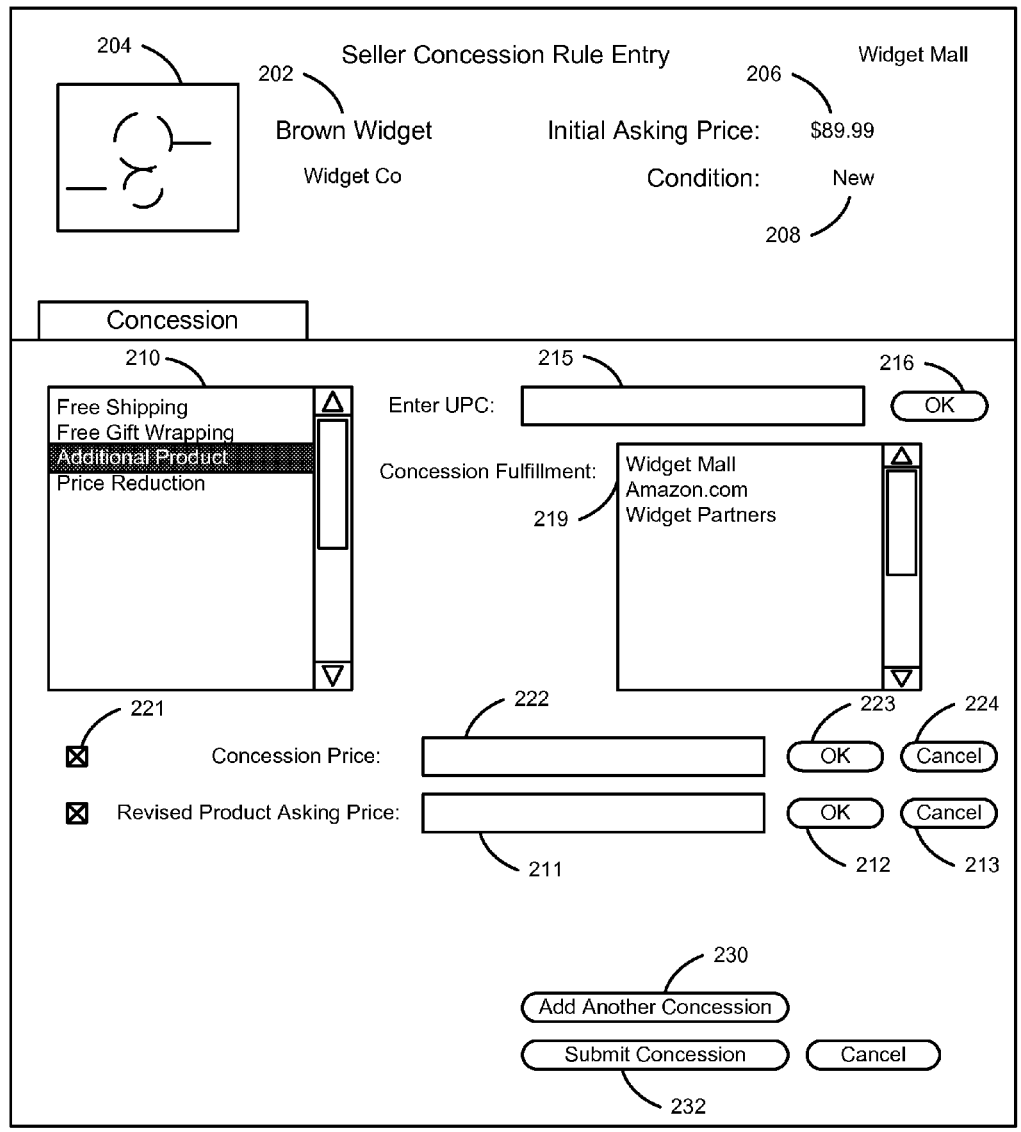
FIG. 2 is a drawing of an example of a user interface that is generated on a client in the network of FIG. 1 that allows a seller to create a seller concession rule to reduce purchase hesitance according to an embodiment of the present disclosure.

Reference is now made to FIG. 2, which shows a drawing of a user interface 110a according to an embodiment of the disclosure. More specifically, the depicted user interface 110a illustrates a seller concession rule entry page generated and presented to a seller wishing to define a concession rule 124 via the client 106 of FIG. 1. As noted above, a concession rule 124 can be received by the concession engine 121 of FIG. 1 and stored in the concession rule data store 123 so that the concession engine 121 may offer a concession to a potential buyer to reduce purchase hesitance. Upon viewing the user interface 110a, a seller may take steps to enter a concession rule 124 by manipulating the various depicted user interface elements.

The depicted user interface 110a includes product information 202 and a product image 204, which provides further information regarding the product for which a seller enters a concession rule 124. The user interface 110a further includes an initial asking price 206 as well as a condition indicator 208 for the product. A seller may select a concession type from the concession list 210. For example, a seller may choose to offer as a concession free shipping, free gift-wrapping, an additional product, or a price reduction. A seller may manipulate the concession list 210 to select at least one of the depicted concessions for submission to the concession engine 116. It should be appreciated that the depicted list of concessions within the concession list 210 is not an exhaustive list, and is but one example of a concession list 210.

Should a seller decide to offer a price reduction as a concession, it may enter a revised asking price in revised asking price field 211. A seller may manipulate revised asking price submission element 212 or revised asking price cancel element 213 to either enter or cancel the entry of a revised asking price. Should a seller choose to offer an additional product as a concession to a potential buyer, the seller may enter a universal product code (UPC) of the additional product in UPC field 215. A seller may cause an additional product to be entered as a concession by manipulating UPC submission element 216.

Additionally, a seller may choose to offer to a potential buyer a selected concession that is fulfilled from various sources. For example, a seller may wish to offer to a potential buyer a concession consisting of free gift-wrapping. However, the gift-wrapping concession may be fulfilled by a third party shipper other than the seller. Accordingly, fulfillment list 210 can allow a seller to choose a fulfillment source for an offered concession that is offered to a potential buyer in the form of a revised offer.

A seller may also define a concession price by manipulating concession price checkbox 221. A concession price is the cost to a potential buyer of the concession that is offered in a revised offer. Should a seller choose to enter a concession price by manipulating concession price checkbox 221, a seller may enter a concession price in concession price field 222. A seller may optionally decide that an offered concession will be complimentary or without cost to a potential buyer by deselecting the concession price checkbox 221 in the user interface 110a. A seller may either confirm or cancel the entry of a concession price by manipulating concession price entry element 223 or concession price entry cancel element 224, respectively.

A seller may further create a concession rule 124 having more than one concession manipulating the user interface 110a to enter a concession and subsequently manipulating additional concession element 230, which causes the concession engine to receive an additional concession in connection with a single concession rule 124. Upon completion of the entry of a concession rule 124, a seller may submit the concession and cause a concession rule 124 to be created by the concession engine 121 in the concession data store 123 by activating concession submission button 232.

Figure 3:
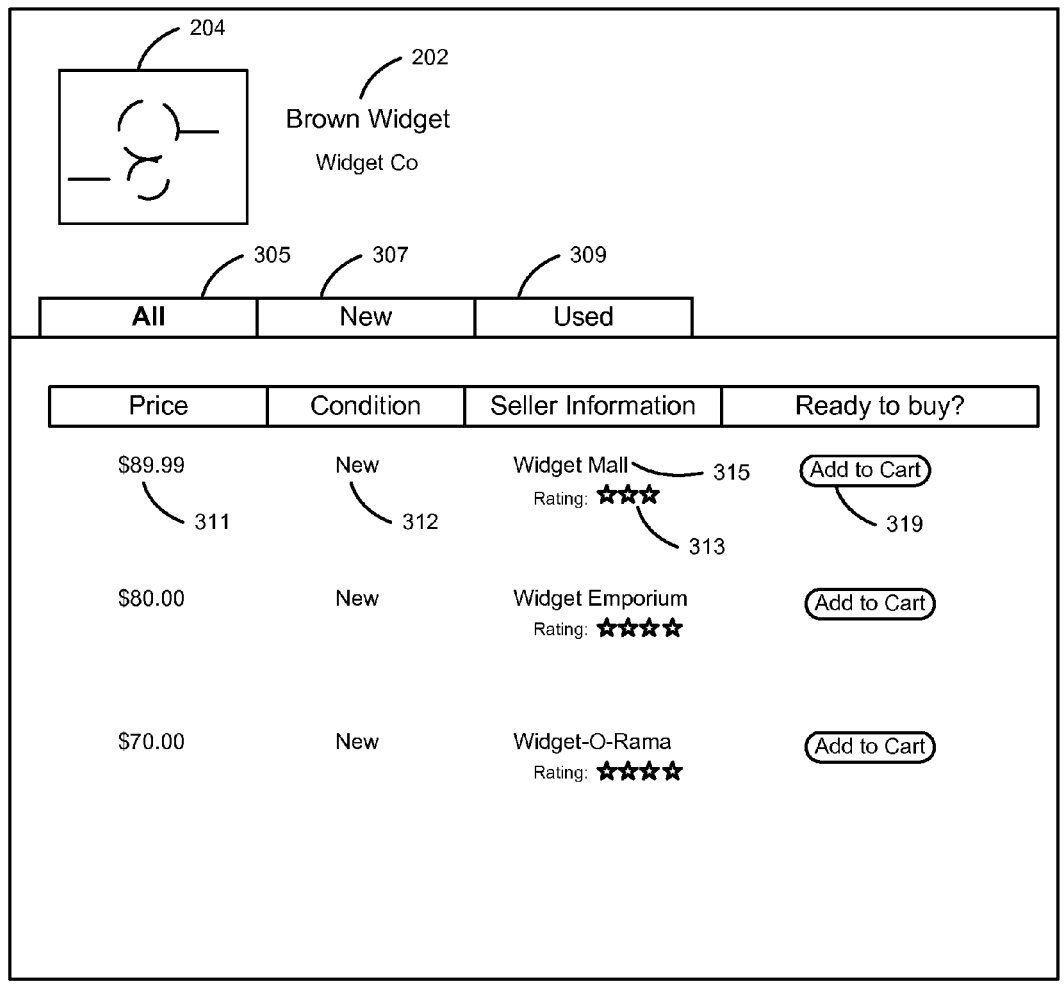
FIG. 3 is a drawing of an example of a user interface generated on a client in the network of FIG. 1 that shows an offer listing page for a product desired by a user according to an embodiment of the present disclosure.

Reference is now made to FIG. 3, which illustrates a graphical user interface 110ba that is hereinafter referred to as an offer listing page. The offer listing page is generated by the server 103 by presenting product listings to a potential buyer via a client 106. The depicted offer listing page is presented to a potential buyer in response to browsing and/or searching for products offered in the electronic commerce system 104. The offer listing page includes a product description 202, which can include further product details including but not limited to the manufacturer suggested retail price and other product details that should be appreciated. The offer listing page can also include a product image 304 as well as filtering selection tab 305, new product filtering tab 307, and used product filtering tab 309. The above referenced selection tabs allow a potential buyer to filter various offers for a product by condition of the product.

The offer listing page displays various offers for a product that can be extended by multiple sellers in the electronic commerce system 104. A price indicator 311 and condition indicator 312 of a product offer indicate the price and condition of a product, respectively. Also shown is a seller rating indicator 313 which can indicate the reputation of a seller within the electronic commerce system 104. A seller indicator 315 indicates the identity of a seller associated with a product offer, and a potential buyer may purchase or add a product offer to a shopping cart by manipulating shopping cart element 319. It should also be noted that the activity of a potential buyer in manipulating the various depicted user interface elements of the offer listing page can be tracked by the tracking engine 117. Therefore, for example, if a potential buyer desires to add one of the depicted product offers to a shopping cart, such activity can be tracked by the tracking engine 117 and stored within tracking data store 120 of FIG. 1. Similarly, if a user views an offer listing page and subsequently exits the electronic commerce system 104 or searches for a substitute product offer, such activity can likewise be tracked by the tracking engine 117.

Accordingly, behavior of the potential buyers associated with purchase hesitance can be identified by the tracking engine 117 and the concession engine 121 can subsequently offer a potential buyer a concession 125 as an incentive in order to reduce or remove such purchase hesitance. For example, in the depicted exemplary offer listing page, the tracking engine 117 may identify that a potential buyer is hesitant to purchase the highest priced product. Therefore, the seller associated with such product offer may wish to offer the potential buyer a concession 125 as an incentive to consummate the purchase.

Figure 4:
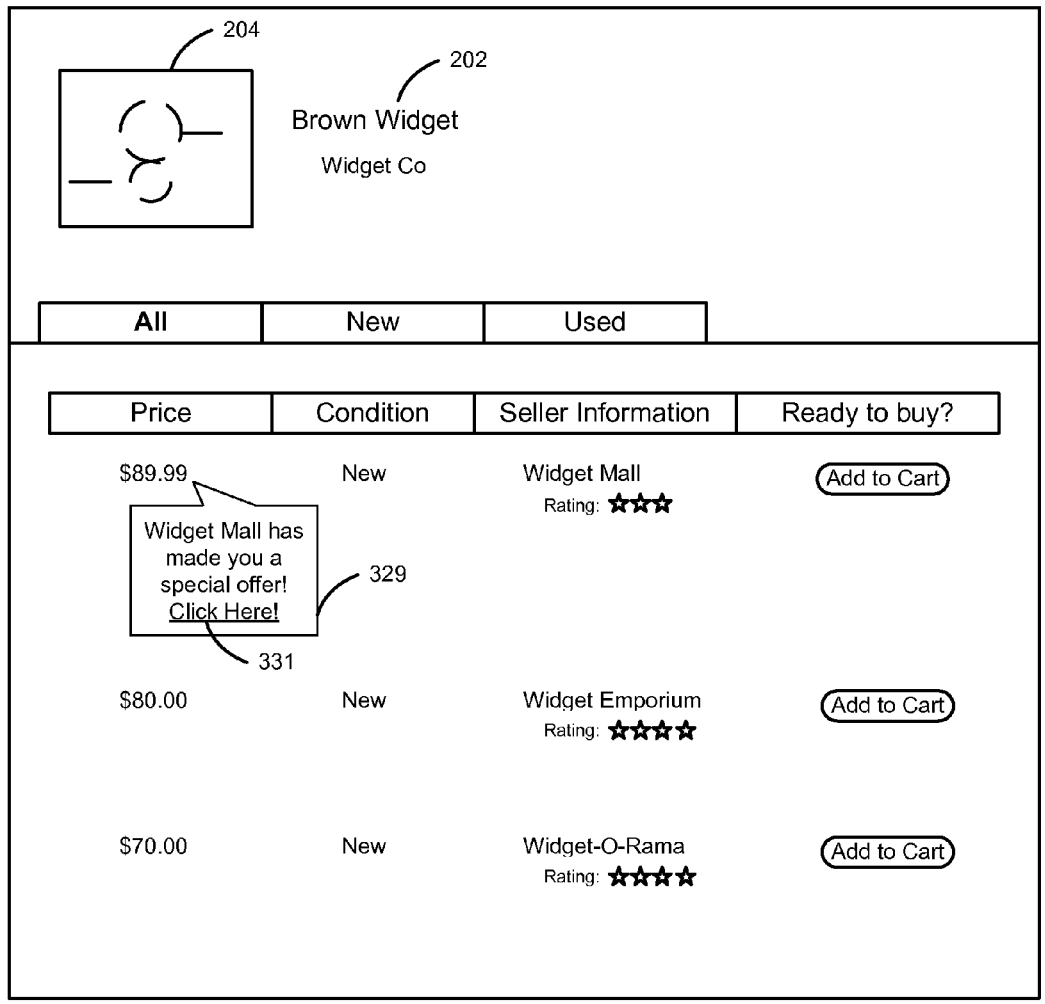
FIG. 4 is a drawing of an example of a user interface generated on a client in the network of FIG. 1 that shows an offer listing page and a concession for a product desired by a user according to an embodiment of the present disclosure.

Accordingly, reference is now made to FIG. 4, which shows a user interface 110*bb*, or an alternative offer listing page. The depicted offer listing page illustrates updated rendering of the offer listing page of FIG. 3. The tracking engine 117, in the depicted example, has identified that a potential buyer may be exhibiting purchase hesitance. Therefore, the concession engine 121 can generate revised offer notifier 329, which can notify a potential buyer of a revised product offer extended by a seller, which can include a concession configured to reduce purchase hesitance. The potential buyer can be alerted via an onscreen message of the existence of a revised offer in a form that may encourage the potential buyer to view and accept the revised offer. It should be appreciated that a potential buyer can be notified in other ways that should be which can include but are not limited to, electronic mail, short message service, and other ways of alerting a user in an electronic commerce system 104. A potential buyer can manipulate revised offer link 331 in order to view the revised offer generated by the concession engine 121.

Figure 5:
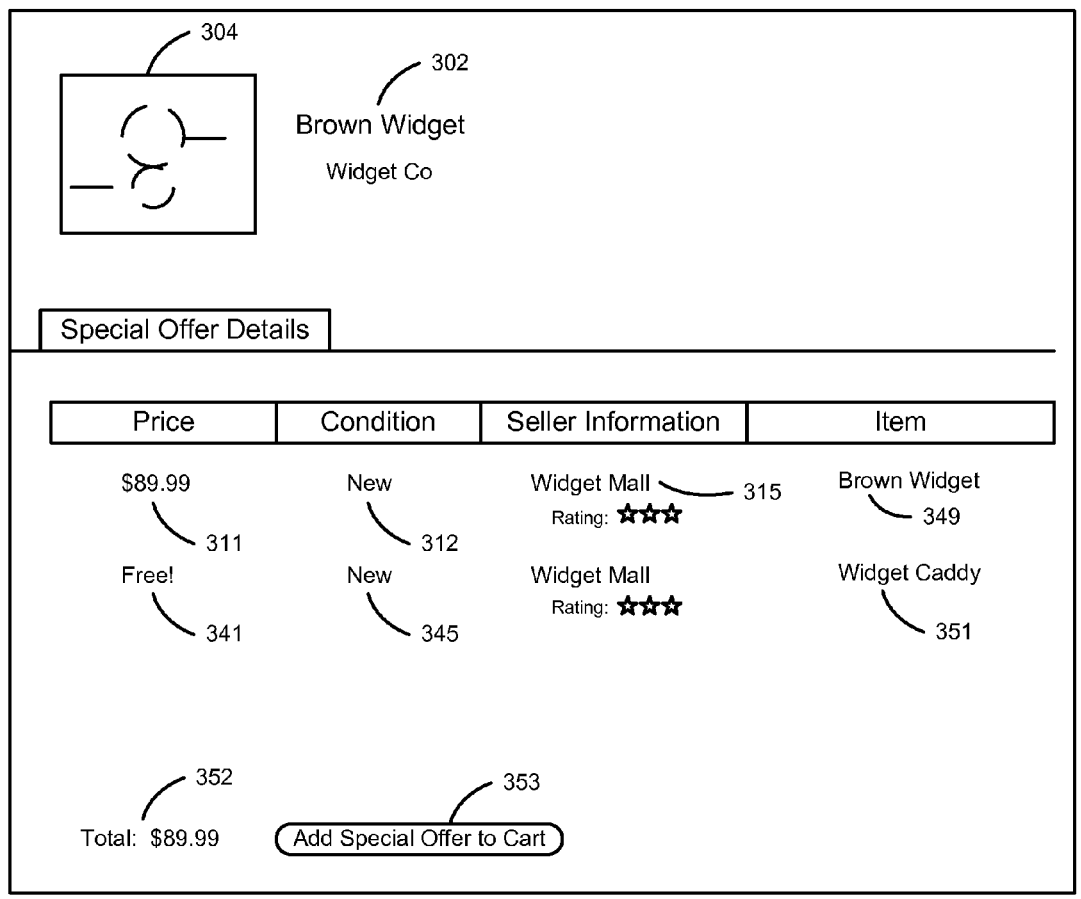
FIG. 5 is a drawing of an example of a user interface generated on a client in the network of FIG. 1 that shows an offer listing page and a concession for a product desired by a user according to an embodiment of the present disclosure.

Accordingly, reference is now made to FIG. 5, which depicts user interface 110*ca*, which is hereinafter referred to as a revised offer page. The revised offer page can be generated by the concession engine and render a revised offer to a potential buyer who has been identified by the tracking engine 117 to exhibit purchase hesitance. The revised offer is configured to reduce such purchase hesitance and entice or incentivise the potential buyer to purchase the revised offer, which includes a concession. The depicted user interface 110*ca* includes product information 302 as well as a product image 304, which can include product details such as a description and other information that should be appreciated.

Also shown in the revised offer page are further details regarding the revised offer presented to a potential buyer. In the depicted example, the price indicator 311 indicates the price of the product, and the concession price indicator 341 indicates the cost of an offered concession. The condition indicator 312 and the concession condition indicator 345 indicate the condition of the product and concession, respectively. Seller indicator 315 further indicates information about the identity of the seller. A product description 349 and concession description 351 indicate a description of the product and offered concession, respectively. A revised value 352 indicates a value of the revised offer, which can be configured to entice or incentivise the potential buyer to purchase the product offer. The potential buyer can purchase or add the revised offer to a shopping cart by manipulating revised offer acceptance element 353. As noted above, the depicted revised offer page can be generated by the concession engine 121 in response to identification by the tracking engine 117 of behavior of the potential buyer that can be associated with a hesitance to purchase a product from a particular seller.

The exemplary revised offer page can be generated by the concession engine 121 by retrieving a concession rule 124 from concession data store 123. A retrieved concession rule 124 identifies a seller 127, a product 129, and at least one concession 125. In the depicted example, the concession 125 embodied in the associated concession rule 124 in concession data store 123 is reflected in the revised offer in the form of an offered concession. Rather than apply a concession rule 124 stored in concession data store 123, the concession engine 121 may also seek feedback from a seller to determine whether to offer a concession to a buyer if the tracking engine 117 detects purchase hesitance. Therefore, for example, upon the detection of purchase hesitance, the concession engine 121 may notify the seller of such hesitance and seek the input of the seller to determine an appropriate seller concession to offer, if any. Additionally, the concession engine 121 may be configured to operate autonomously in the absence of a stored concession rule 124 associated with the product and seller. For example, the concession engine 121 may seek additional products, concessions, or offers existing elsewhere in the inventory of the seller or elsewhere in the electronic commerce system 104 and bundle the products, concessions, or offers for presentation to the potential buyer as a revised offer. In this way, the concession engine 121 is autonomously assembling a revised offer on behalf of a seller for presentation to a potential buyer exhibiting purchase hesitance.

Figure 6:
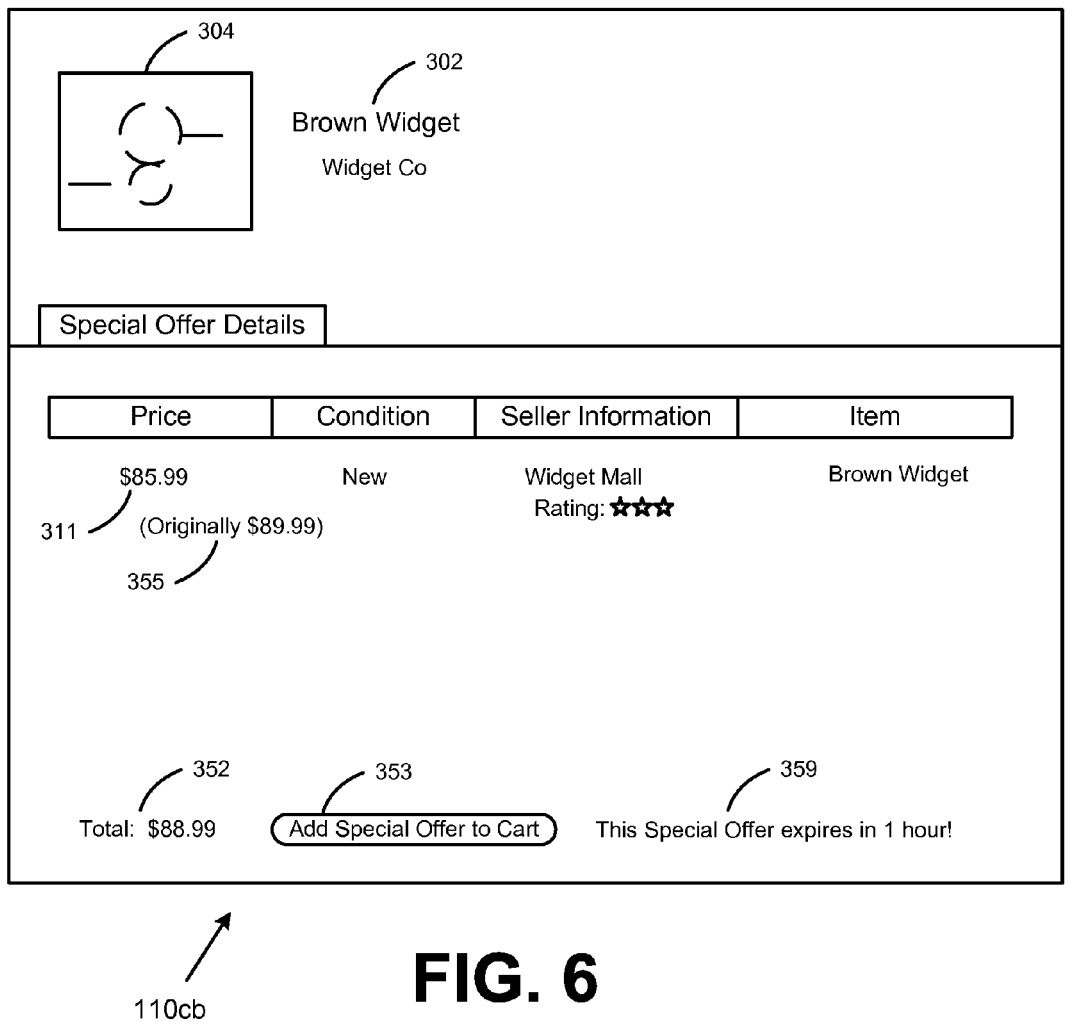
FIG. 6 is a drawing of an example of a user interface generated on a client in the network of FIG. 1 that shows an offer listing page and a concession for a product desired by a user according to an embodiment of the present disclosure.

Reference is now made to FIG. 6, which depicts a user interface 110*cb* that illustrates alternative revised offer page. The alternative revised offer page displays a revised offer to a potential buyer who has been identified to exhibit purchase hesitance. The revised offer is configured to reduce purchase hesitance and entice or incentivise the potential buyer to purchase the revised offer, which includes a concession. The depicted user interface includes product information 302 as well as a product image 304, which can include product details such as a description and other information that should be appreciated.

In the depicted revised offer page, the concession offered to a potential buyer is a price reduction, which is indicated by price indicator 311. Price reduction indicator 355 indicates to a potential buyer an original price of the product offer, which communicates to the potential buyer that the concession offered is a price reduction. In addition, the concession engine 121 can provide an expiration of the revised offer, which can add an element of pressure to encourage a potential buyer to make a purchase decision within the expiration window. Accordingly, an expiration indicator 359 is shown, indicating to the user the expiration of the revised offer presented on the revised offer page. A seller may define the time expiry component when defining a concession rule 124, or a seller may choose to provide a time expiry component to all concession rules 124 associated with the seller and stored within the concession data store 123. Alternatively, a seller may rely on the concession engine 121 to autonomously define an expiration window for a revised offer. The concession engine 121 may operate autonomously in this fashion by analyzing the product in the revised offer and make expiry decisions based on the competitiveness of the marketplace, the fluidity of the pricing of the product in the marketplace, and other factors that should be appreciated. If a potential buyer presented with user interface 110cb chooses to accept the terms of the revised offer, the potential buyer can manipulate the acceptance element 353 and add the revised offer to a shopping cart assigned to the potential buyer.

Figure 7:
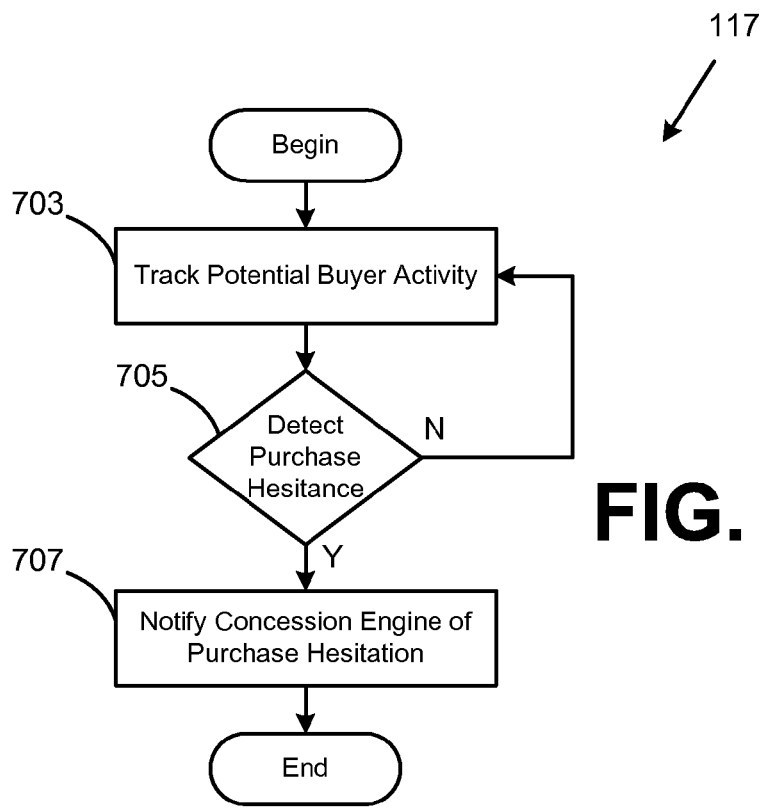
FIG. 7 is a flow chart that provides one example of the operation of the tracking engine of the electronic commerce system of FIG. 1 according to an embodiment of the present disclosure.

With reference to FIG. 7, shown is a flow chart that provides one example of the execution of the tracking engine 117 (FIG. 1). Alternatively, FIG. 7 shows steps of a method implemented in the server 103. In this respect, in box 703, the activity of a potential buyer is tracked within the electronic commerce system 104. As noted above, the tracking engine 117 tracks the activity of a potential buyer and stores information regarding such activity in a tracking data store 119. Then, in box 705, the tracking engine 117 determines whether the activity of a potential buyer reflects purchase hesitance. As noted above, the tracking engine may detect purchase hesitance by analyzing the activity of the potential buyer in the electronic commerce system 104. If no purchase hesitance is detected, the tracking engine 117 continues to track and analyze the activity and behavior of a potential buyer. If purchase hesitance is detected, then in box 707, the tracking engine notifies the concession engine 121 of the purchase hesitance, which can determine whether a concession is offered to a potential buyer in order to incentivise the potential buyer to consummate a purchase.

Figure 8:
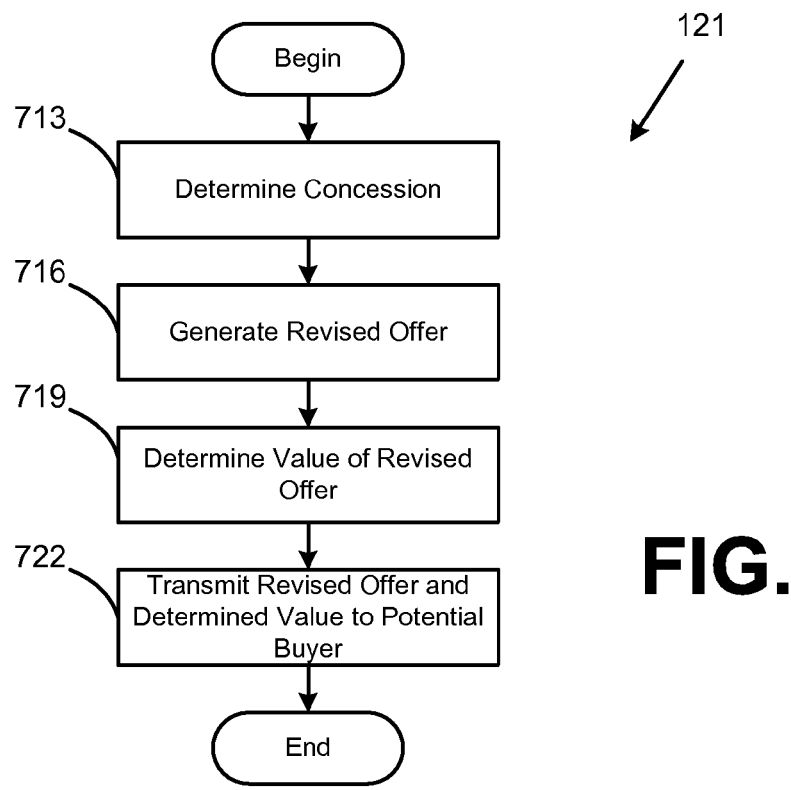
FIG. 8 is a flow chart that provides one example of the operation of the concession engine of the electronic commerce system of FIG. 1 according to an embodiment of the present disclosure.

Accordingly, reference is now made to FIG. 8, which provides one example of the execution of the concession engine 121 (FIG. 1). Alternatively, FIG. 8 shows steps of a method implemented in the server 103. As noted above, the tracking engine 117 may determine that a potential buyer is exhibiting purchase hesitance with respect to a particular product from a particular seller. Accordingly, the tracking engine 117 notifies the concession engine 121 of the purchase hesitance and the concession engine 121 can determine whether a concession is offered to the potential buyer. A concession generated by the concession engine 121 is configured to incentivise a potential buyer to make a purchase in the electronic commerce system 104 if the tracking engine 117 identifies purchase hesitance.

In this respect, in box 713 the concession engine 713 determines the concession offered to the potential buyer. As noted above, the concession engine 121 may determine a concession to offer a potential buyer by retrieving a concession rule 124 from the concession data store 123. Accordingly, if a concession rule 124 associated with the seller 127 and product 129 resides in the concession data store 123, the concession engine 121 can retrieve a concession 125. Alternatively, in box 713 the concession engine 121 may autonomously generate a concession to offer to a potential buyer. As noted above, the concession engine 121 may generate a concession autonomously by offering a product, service, or other offer from the inventory of a seller or elsewhere within or outside of the electronic commerce system 104. As another alternative, a seller may wish to forgo autonomous generation of a concession. In this scenario, as noted above, a seller can be notified of purchase hesitance of the potential buyer and be presented with an option to offer the potential buyer a concession.

Next, in box 716 the concession engine 121 generates a revised offer for presentation to a potential buyer exhibiting purchase hesitance. The revised offer includes at least one concession generated in box 713 as well as a product associated with the concession. As noted above, the revised offer may expire after a predetermined period of time to introduce an element of pressure on the potential buyer to make a purchasing decision. In box 719, the concession engine 721 can determine a value of the revised offer, which can also be presented to the potential buyer in order to incentivise the potential buyer to consummate a purchase. The value can be included in the revised offer in order to communicate that the revised offer offers an improved value relative to the purchase of the product alone. Then, in box 722, the generated revised offer is transmitted to the potential buyer.

Figure 9:
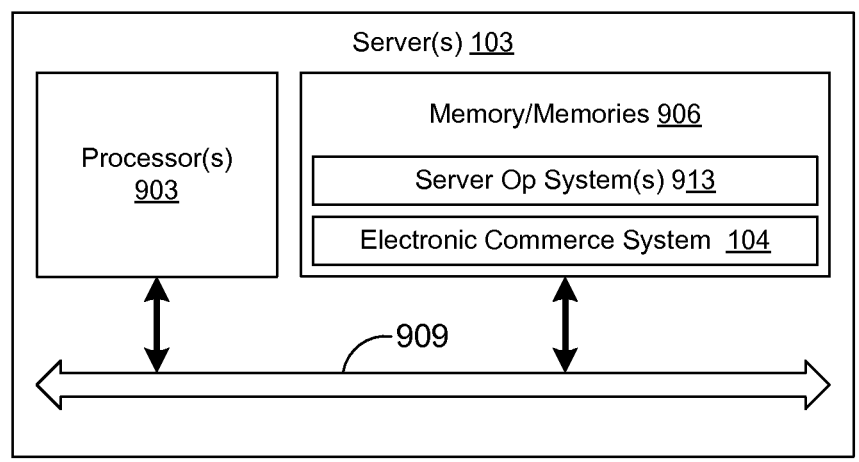
FIG. 9 is a block diagram of one example embodiment of a server in the network of FIG. 1 according to an embodiment of the present disclosure.

With reference to FIG. 9, shown is one example of a server 103 that comprises a computer server or equivalent device according to an embodiment of the present disclosure. The server 103 may include one or more processor circuits having a processor 903 and a memory 906, both of which are coupled to a local interface 909. In this respect, the local interface 909 may comprise, for example, a data bus with an accompanying control/address bus as can be appreciated.

Stored on the memory 906 and executable by the processor 903 are various components such as a server operating system 913 and the electronic commerce system 104. In addition, it is understood that many other components may be stored in the memory 906 and executable by the processor(s) 903. Also, such components may reside in a memory that is external from the server 103 as can be appreciated.

As set forth above, a number of components are stored in the memory 906 and are executable by the processor 903. In this respect, the term "executable" refers to a program file that is in a form that can ultimately be run by the processor 903. Examples of executable programs may be, for example, a compiled program that can be translated into machine code in a format that can be loaded into a random access portion of the memory 906 and run by the processor 903, or source code that may be expressed in proper format such as object code that is capable of being loaded into a random access portion of the memory 906 and executed by the processor 903. An executable program may be stored in any portion or component of the memory 906 including, for example, random access memory, read-only memory, a hard drive, compact disk (CD), floppy disk, or other memory components.

The memory 906 is defined herein as both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 903 may represent multiple processors and the memory 906 may represent multiple memories that operate in parallel. In such a case, the local interface 909 may be an appropriate network that facilitates communication between any two of the multiple processors, between any processor and any one of the memories, or between any two of the memories, etc. The processor 903 may be of electrical, optical, or of some other construction as can be appreciated by those with ordinary skill in the art.

The server operating system 913 is executed to control the allocation and usage of hardware resources such as the memory and processing time in the server 103. In this manner, the server operating system 913 serves as the foundation on which applications depend as is generally known by those with ordinary skill in the art.

The flow charts of FIGS. 7-8 show the functionality and operation of an implementation of the server 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIG. 7-8 show a specific order of execution, it is understood that the order of execution may differ from that which is depicted. For example, the order of execution of two or more blocks may be scrambled relative to the order shown. Also, two or more blocks shown in succession in FIGS. 7-8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems are expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the network page for use by or in connection with the instruction execution system.

The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the functionality of various are described above with respect to FIGS. 1-8 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the invention, at least the following is claimed:

1. A method, comprising:
   encoding for display to a buyer at least one product offered by at least one seller at an initial price;
   tracking activity of the buyer throughout an electronic commerce system, wherein the electronic commerce system is at least one of an electronic auction system, a fixed price electronic marketplace, or an electronic marketplace allowing for price negotiation between the buyer and the at least one seller;
   identifying a hesitance of the buyer in the activity to purchase the at least one product from the at least one seller by detecting when the buyer searches for a substitute product, wherein the substitute product differs from the at least one product;
   offering at least one concession from the at least one seller to the buyer in association with the offering of the at least one product, the at least one concession comprising a revised offer configured to provide incentive to the buyer to purchase the at least one product within the electronic commerce system, wherein the revised offer expires within a predetermined amount of time;
   encoding for display to the buyer a retail value of the revised offer; and
   transmitting the revised offer to the buyer, wherein the step of transmitting further comprises alerting the buyer of the revised offer using at least one of an electronic mail message, a short message service message, a popup window, or an on-screen message.

2. The method of claim 1, wherein identifying the hesitance of the buyer further comprises determining when the buyer views the at least one product within the electronic commerce system and subsequently exits the electronic commerce system.

3. The method of claim 1, wherein identifying the hesitance of the buyer further comprises determining when the buyer adds the at least one product to a shopping cart assigned to the buyer in the electronic commerce system.

4. The method of claim 3, further comprising determining when the buyer subsequently removes the at least one product to the shopping cart.

5. The method of claim 1, wherein identifying the hesitance of the buyer further comprises detecting when the buyer seeks the at least one product from an alternate seller within the electronic commerce system, wherein the alternate seller differs from the at least one seller.

6. The method of claim 1, wherein identifying the hesitance of the buyer further comprises determining when a first price of the at least one product offered by the at least one seller is offered by a competing seller within the electronic commerce system at a second price, wherein the second price is lower than the first price.

7. The method of claim 1, wherein identifying the hesitance of the buyer further comprises determining when the buyer has attempted to negotiate a sales price of the at least one product with the at least one seller.

8. The method of claim 1, wherein the at least one concession further comprises reducing the initial price of the at least one product.

9. The method of claim 1, wherein offering the at least one concession further comprises identifying an additional product and the additional product is the at least one concession.

10. The method of claim 9, wherein the additional product is an item that is associated with the at least one product.

11. The method of claim 9, wherein the additional product is offered to the buyer at a reduced price, wherein the reduced price is lower than a retail price of the additional product.

12. The method of claim 9, wherein the additional product is offered to the buyer free of charge.

13. The method of claim 1, wherein the at least one concession is at least one of a reduced shipping cost, a reduced gift wrapping cost, an additional product, the at least one product at a price lower than the initial price, or a discount on a future purchase.

14. The method of claim 1, wherein offering at least one concession further comprises defining a concession rule describing at least one predetermined concession offered to buyers, the at least one predetermined concession corresponding to the at least one product.

15. The method of claim 1, wherein offering at least one concession further comprises:
   notifying the at least one seller that the buyer exhibits the hesitance to purchase the at least one product; and
   encoding for display a concession form to be presented to the at least one seller to define the at least one concession.

16. The method of claim 1, wherein offering at least one concession further comprises:
   defining a concession rule describing a predetermined monetary value of the at least one concession; and
   identifying a concession having a monetary value less than or equal to the predetermined monetary value.

17. A program embodied in a computer readable medium and executable by a processor-based system, comprising:
   code that displays to a buyer at least one product offered by at least one seller at an initial price;
   code that tracks activity of the buyer throughout an electronic commerce system wherein the electronic commerce system is at least one of an electronic auction system, a fixed price electronic marketplace, or an electronic marketplace allowing for price negotiation between the buyer and the at least one seller;
   code that identifies a hesitance of the buyer in the activity to purchase the at least one product from the at least one seller by detecting when the buyer searches for a substitute product, wherein the substitute product differs from the at least one product;
   code that offers at least one concession from the at least one seller to the buyer in association of the at least one product, the at least one concession comprising a revised offer configured to provide incentive to the buyer to purchase the at least one product within the electronic commerce system, wherein the revised offer expires within a predetermined amount of time;
   code that encodes for display a retail value of the revised offer; and
   code that transmits the revised offer to the buyer by alerting the buyer of the revised offer using at least one of an electronic mail message, a short message service message, a popup window, or an on-screen message.

18. The program embodied in the computer readable medium and executable by the processor-based system of claim 17, wherein the code that identifies a hesitance of the buyer further comprises code that determines when the buyer views the at least one product within the electronic commerce system and subsequently exits the electronic commerce system.

19. The program embodied in the computer readable medium and executable by the processor-based system of claim 17, wherein the code that identifies a hesitance of the buyer further comprises code that determines when the buyer adds the at least one product to a shopping cart assigned to the buyer in the electronic commerce system.

20. The program embodied in the computer readable medium and executable by the processor-based system of claim 17, further comprising code that determines when the buyer subsequently removes the at least one product to a shopping cart.

21. The program embodied in the computer readable medium and executable by the processor-based system of claim 17, wherein the code that identifies a hesitance of the buyer further comprises code that detects when the buyer seeks the at least one product from an alternate seller within the electronic commerce system, wherein the alternate seller differs from the at least one seller.

22. The program embodied in the computer readable medium and executable by the processor-based system of claim 17, wherein the code that identifies a hesitance of the buyer further comprises code that determines when a first price of the at least one product offered by the at least one seller is offered by a competing seller within the electronic commerce system at a second price, wherein the second price is lower than the first price.

23. The program embodied in the computer readable medium and executable by the processor-based system of claim 17, wherein the code that identifies a hesitance of the buyer further comprises code that determines when the buyer has attempted to negotiate a sales price of the at least one product with the at least one seller.

24. The program embodied in the computer readable medium and executable by the processor-based system of claim 17, wherein the code that transmits further comprises code that alerts the buyer of the revised offer using at least one of an electronic mail message, a short message service message, a popup window, and an on-screen message.

25. The program embodied in the computer readable medium and executable by the processor-based system of claim 17, wherein the at least one concession further comprises a reduction of the initial price of the at least one product.

26. The program embodied in the computer readable medium and executable by the processor-based system of claim 17, wherein the code that offers at least one concession further comprises code that identifies an additional product and the additional product is the at least one concession.

27. The program embodied in the computer readable medium and executable by the processor-based system of claim 26, wherein the additional product is an item that is associated with the at least one product.

28. The program embodied in the computer readable medium and executable by the processor-based system of claim 26, wherein the additional product is offered to the buyer at a reduced price, wherein the reduced price is lower than a retail price of the additional product.

29. The program embodied in the computer readable medium and executable by the processor-based system of claim 26, wherein the additional product is offered to the buyer free of charge.

30. The program embodied in the computer readable medium and executable by the processor-based system of claim 17, wherein the at least one concession is at least one of a reduced shipping cost, a reduced gift wrapping cost, an additional product, the at least one product at a price lower than the initial price, or a discount on a future purchase.

31. The program embodied in the computer readable medium and executable by the processor-based system of claim 17, wherein the code that offers at least one concession further comprises code that defines a concession rule describing at least one predetermined concession offered buyers, the at least one predetermined concession corresponding to the at least one product.

32. The program embodied in the computer readable medium and executable by the processor-based system of claim 17, wherein the code that offers at least one concession further comprises:
  code that notifies the at least one seller that the buyer exhibits the hesitance to purchase the at least one product; and
  code that encodes for display a concession form to be presented to the at least one seller to define the at least one concession.

33. The program embodied in the computer readable medium and executable by the processor-based system of claim 17, wherein the code that offers at least one concession further comprises:
  code that defines a concession rule describing a predetermined monetary value of the at least one concession; and
  code that identifies a concession having a monetary value less than or equal to the predetermined monetary value.

34. A system, comprising:
  at least one computing device in communication with a client computing device associated with a buyer; and
  application program code executed in the at least one computing device causing the at least one computing device to:
    display to the buyer at least one product offered by at least one seller at an initial price;
    track activity of the buyer throughout an electronic commerce system wherein the electronic commerce system is at least one of an electronic auction system, a fixed price electronic marketplace, or an electronic marketplace allowing for price negotiation between the buyer and the at least one seller;
    identify a hesitance of the buyer in the activity to purchase the at least one product from the at least one seller by detecting when the buyer searches for a substitute product, wherein the substitute product differs from the at least one product;
    offer at least one concession from the at least one seller to the buyer in association of the at least one product, the at least one concession comprising a revised offer configured to provide incentive to the buyer to purchase the at least one product within the electronic commerce system, wherein the revised offer expires within a predetermined amount of time;
    encode for display a retail value of the revised offer; and
    transmit the revised offer to the buyer by alerting the buyer of the revised offer using at least one of an electronic mail message, a short message service message, a popup window, or an on-screen message.

35. The system of claim 34, wherein the application program code executed in the at least one computing device causing the at least one computing device to identify a hesitance of the buyer further determines when the buyer views the at least one product within the electronic commerce system and subsequently exits the electronic commerce system.

36. The system of claim 34, wherein the application program code executed in the at least one computing device causing the at least one computing device to identify a hesitance of the buyer further determines when the buyer adds the at least one product to a shopping cart assigned to the buyer in the electronic commerce system.

37. The system of claim 34, wherein the application program code executed in the at least one computing device causing the at least one computing device to identify a hesitance of the buyer further comprises logic that determines when the buyer subsequently removes the at least one product to a shopping cart.

38. The system of claim 34, wherein the at least one concession further comprises a reduction of the initial price of the at least one product.

39. The system of claim 34, wherein the application program code executed in the at least one computing device causing the at least one computing device to offer at least one concession further identifies an additional product and the additional product is the at least one concession.

40. The system of claim 39, wherein the additional product is an item that is associated with the at least one product.

41. The system of claim 39, wherein the additional product is offered to the buyer at a reduced price, wherein the reduced price is lower than a retail price of the additional product.

42. The system of claim 34, wherein the at least one concession is at least one of a reduced shipping cost, a reduced gift wrapping cost, an additional product, the at least one product at a price lower than the initial price, or a discount on a future purchase.

* * * * *

UNITED STATES PATENT AND TRADEMARK OFFICE
CERTIFICATE OF CORRECTION

| | | |
|---|---|---|
| PATENT NO. | : 8,566,170 B1 | Page 1 of 1 |
| APPLICATION NO. | : 12/039794 | |
| DATED | : October 22, 2013 | |
| INVENTOR(S) | : B. Anthony Joseph and Matthew K. Green | |

It is certified that error appears in the above-identified patent and that said Letters Patent is hereby corrected as shown below:

In the Claims

Claim 1, column 12, lines 56, 57: delete the words "the step of".

Signed and Sealed this
Twenty-ninth Day of July, 2014

Michelle K. Lee
*Deputy Director of the United States Patent and Trademark Office*